United States Patent
Lewis et al.

(10) Patent No.: US 7,513,923 B1
(45) Date of Patent: Apr. 7, 2009

(54) VARIABLE IMPEDANCE AIR FILTER FOR ELECTRONIC SYSTEMS

(75) Inventors: Donald Lewis, Richmond, CA (US); Ting-Yu Tsang, Mountain View, CA (US); John I. Kull, Rohnert Park, CA (US)

(73) Assignee: Force10 Networks, Inc., San Jose, CA (US)

(*) Notice: Subject to any disclaimer, the term of this patent is extended or adjusted under 35 U.S.C. 154(b) by 399 days.

(21) Appl. No.: 11/135,479

(22) Filed: May 23, 2005

(51) Int. Cl.
*B01D 46/00* (2006.01)

(52) U.S. Cl. .................. 55/385.6; 55/385.2; 55/479; 55/482; 55/486; 55/502; 55/529; 55/498; 454/184; 454/192

(58) Field of Classification Search .......... 55/385.6, 55/479, 482, 486, 498, 502, 529, DIG. 5, 55/385.3, 385.2; 454/184, 192
See application file for complete search history.

(56) References Cited

U.S. PATENT DOCUMENTS

| | | | | |
|---|---|---|---|---|
| 4,200,444 A | * | 4/1980 | Witchell | 55/484 |
| 4,640,779 A | * | 2/1987 | Taki et al. | 210/493.5 |
| 5,968,215 A | * | 10/1999 | Webb | 55/385.3 |
| 6,312,489 B1 | * | 11/2001 | Ernst et al. | 55/385.3 |
| 6,480,381 B2 | * | 11/2002 | Negishi | 361/695 |
| 2007/0135032 A1 | * | 6/2007 | Wang | 454/184 |

* cited by examiner

*Primary Examiner*—Duane S Smith
*Assistant Examiner*—Minh-Chau T Pham
(74) *Attorney, Agent, or Firm*—James E Harris

(57) ABSTRACT

In one embodiment, a removable air filter is mounted proximate to where electrical equipment is mounted in a case. The filter has at least two sections with different finite air impedances. The filter is constructed of a filter media mounted inside of a frame. When the equipment arrangement is modified, the filter can be replaced with another filter with a different impedance profile, such that the air flow remains optimal for many equipment arrangements. The impedance profile can also be tailored to compensate for the characteristic airflow of the case design. Other embodiments are described and claimed.

51 Claims, 5 Drawing Sheets

VARIABLE IMPEDANCE AIR FILTER FOR ELECTRONIC SYSTEMS

BACKGROUND

1. Field of the Invention

This invention relates to a case for mounting electronic equipment that uses air cooling, and more specifically to a filter with a variable impedance for use in such a case.

2. Description of Related Art

In the electronic industry, the trend toward faster operating speeds and increased circuit density has created a trend towards ever-increasing power consumption. With this increase in power consumption comes a need for increased heat dissipation and component cooling.

Electronic equipment is typically cooled by forcing air over the equipment in order to carry away the dissipated heat. Referring to FIG. 1, air is flowed over equipment (not shown) mounted inside a case 100. Air movers 150 expel air from the top of the case and draw air in from the bottom. Because cases are often stacked close to each other vertically, plenums such as plenum 160, open to the front, rear, and/or side of the case 100, are used to insure proper spacing in order to intake and exhaust air. Air movers 150 are often mounted in the back of the case or inside a plenum 170 located at the top of the case.

Air enters plenum 160 horizontally and turns upwards before entering the section of the case where equipment is mounted. Several techniques are employed to assist in redirecting the air and to assist in evenly distributing the air flow after the air has made this turn. One technique used to evenly distribute the air is to use a lower baffle 130 that the air must first pass through to enter the case. Baffle 130 has holes drilled in it for air to flow through. By varying the hole size in one or both axes perpendicular to the airflow through the electronics to be cooled, the impedance to the air can be varied (section 120, pictured across the back of baffle 130, is shown with smaller holes than the front section of baffle 130).

In addition, ramps 110 may be used to further distribute the air evenly across the bottom of the case. Ramps 110 are placed in lower plenum 160 in order to re-direct the air from moving horizontally across the case to moving vertically into the case. Ramps of various heights can be used such that the air is redirected in a manner that evenly distributes the air front-to-back.

Air mover placement is also used to ensure air evenly exits the case. In the case top view of FIG. 2, more fans 150 are placed toward the front of the case to counter the air flow's tendency to exit towards the back of the case.

These techniques are not necessarily employed individually, but often times many if, not all, of them are employed simultaneously.

BRIEF DESCRIPTION OF THE DRAWINGS

The invention may be best understood by reading the disclosure with reference to the drawings, wherein.

DETAILED DESCRIPTION

Much of today's electronic equipment that requires air cooling, such as computers and networking gear, is mounted in versatile cases that have a variety of configurations. For example, different circuit cards, modules, and/or integrated circuits can be added or switched in and out depending on a user's needs. This presents many different possible configurations for a given case. Because each of these configurations can present a different temperature profile, each configuration may have different cooling requirements. Current air distribution systems are fixed at the time of manufacture and cannot be significantly adjusted. This forces the design of the air distribution profile to be fixed. Because of the lack of adjustability, cases are often designed to simply distribute air evenly. Uniform air distribution is not always ideal, however because of the variability of case cooling needs. Furthermore, uniform air distribution can be difficult to achieve. There is a need for an air distribution system that can distribute air where it is most needed throughout the case, and conserve air where it is less needed.

Figure 1:
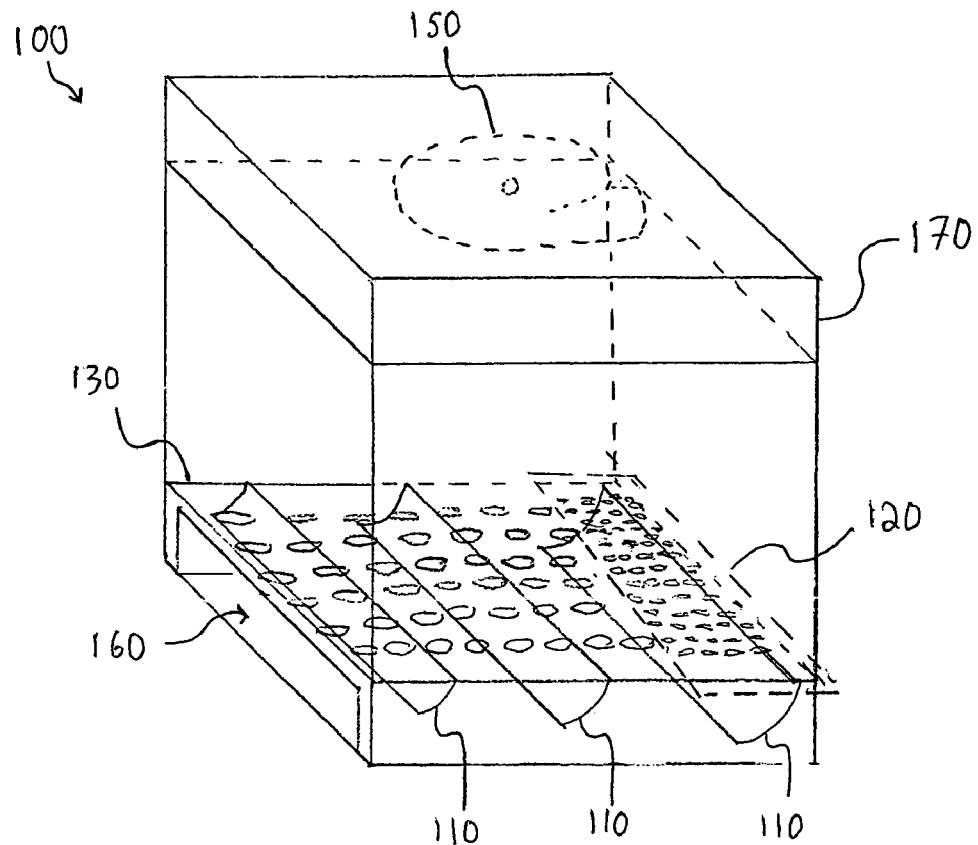
FIG. 1 shows a prior art case that uses ramps and a perforated baffle for directing air flow.
Figure 2:
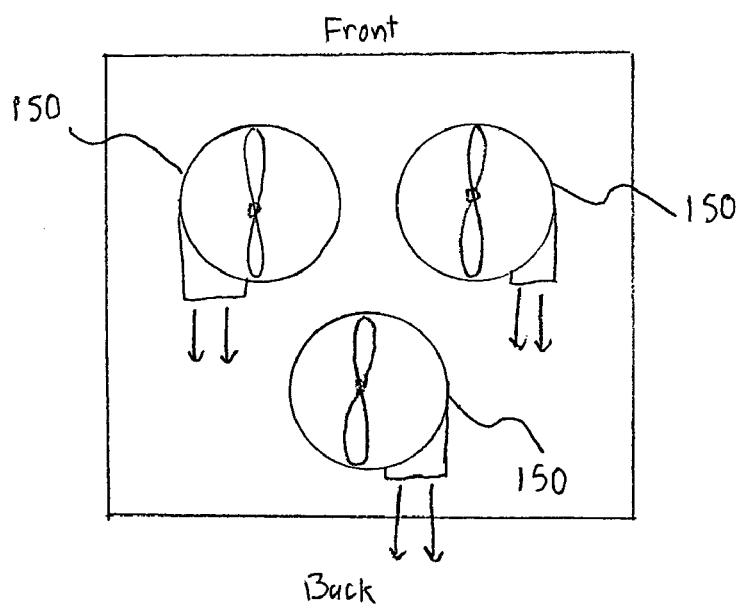
FIG. 2 shows one possible prior art fan placement on a case.
Figure 3:
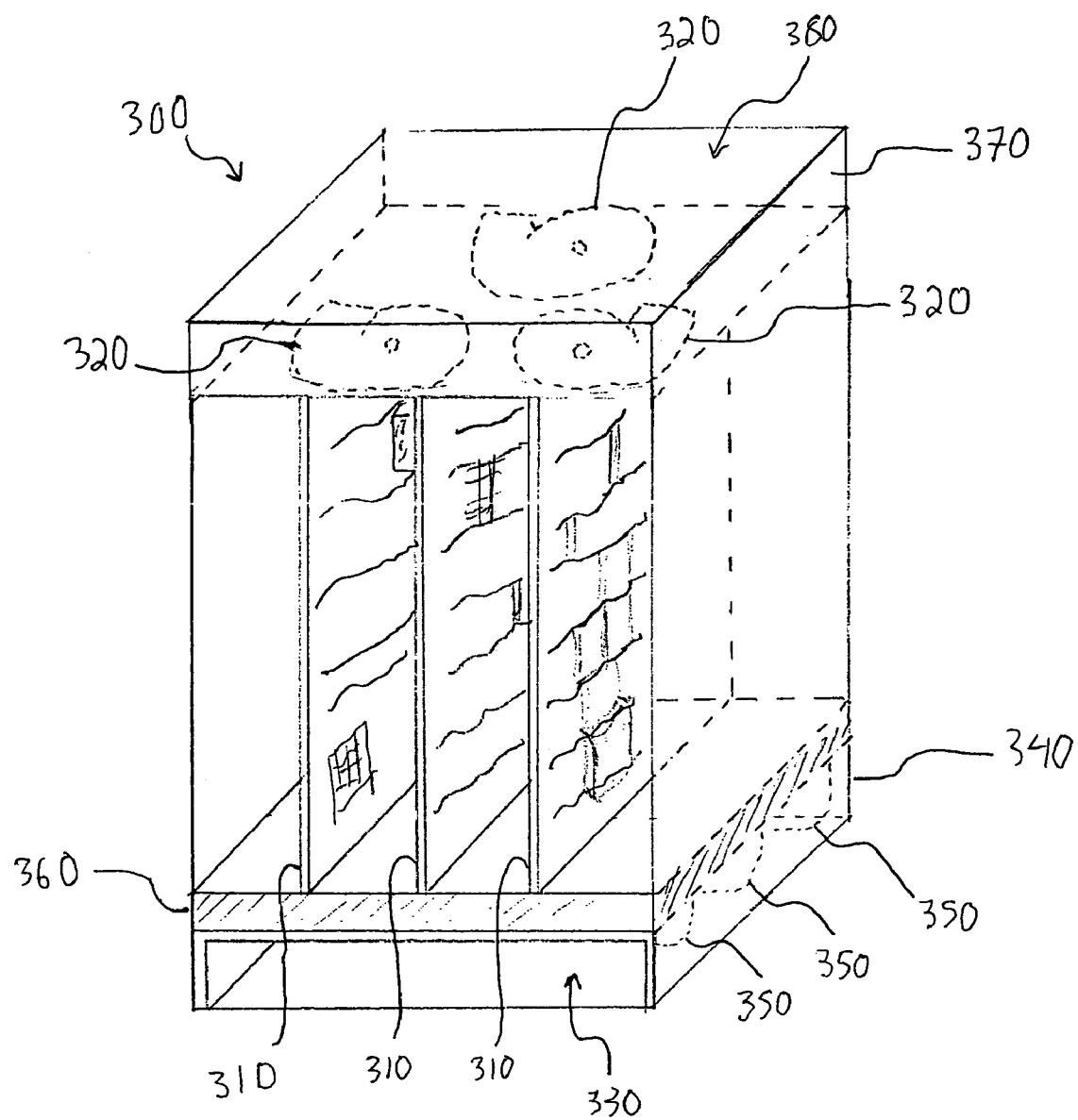
FIG. 3 shows a case that uses a removable air filter to direct airflow.

The disclosed embodiments describe an apparatus and method for cooling electronic equipment using a variable impedance air filter. Using an air filter to distribute air throughout a case allows for the air distribution to be accomplished in some embodiments without the insertion of additional impedances into the system. Referring to FIG. 3, air is forced through a case 300 for mounting electronic equipment 310 using a means of moving the air such as air movers 320. In some embodiments, air movers 320 may be used to lower the case's internal air pressure below the external air pressure to create a negative pressure case. In the FIG. 3 embodiment, air is drawn into case 300 through an opening 330 in a lower plenum 340, past the electronic equipment 310, and into an upper plenum 370, where the air movers 320 force air out of case 300. In an alternative embodiment, air movers 320 may be used to increase the case's internal air pressure above the external air pressure to create a positive pressure case. In such an embodiment, air forced into the case by air movers 320 exits through case openings lying opposite the air movers with respect to the electronics to be cooled. Many other possible air-movement arrangements could also be selected for an embodiment, including: the use of multiple air movers to force air into the case at one point and draw air from the case at another point; the use of intermediate air movers between different electronics case sections; and even air movement accomplished using only natural convection to draw air past warm electrical components.

Lower plenum 340 may be used with case 300 in order to provide an air intake 330. In many situations, case 300 may be mounted directly above other equipment, and thus a plenum will be needed to create an exterior opening for air intake. As the air enters case 300 through intake 330 in plenum 340, the air is traveling horizontally. The air is turned to flow generally vertically through the electronics section to reach an upper plenum 370 containing air movers 320 and an exhaust port 380 at the rear top of the case 300. Inside plenum 340, a group of ramps 350 may be used to assist the air turning up into the case. These ramps may also be used to partially control the air flow pattern inside case 300. By having some ramps extend further down than others, the proportion of air the ramps redirect can be varied. The ramp position may also be adjustable such that the ramps can be shifted front-to-back to make minor corrections to the air flow pattern.

Figure 4:
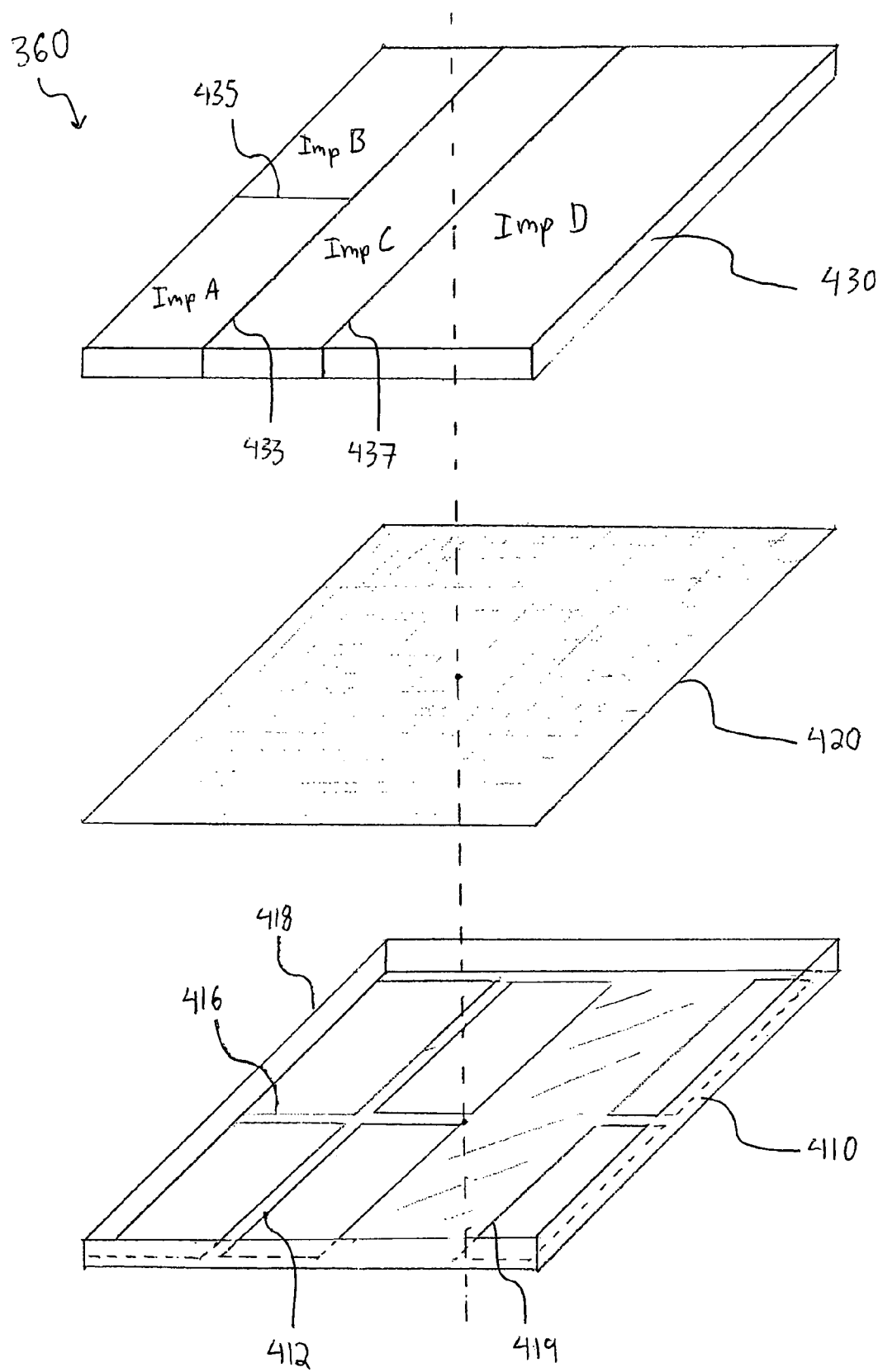
FIG. 4 is an exploded view of a removable air filter.

For more precise air redirection, a filter 360 according to an embodiment of this invention can be used. Air filter 360 includes a filter media with an impedance that varies over its surface. The variation of impedance can be used to control the airflow pattern. Where there are low impedance sections of filter 360, more air flows. Where there are high impedance sections of filter 360, less air flows. In FIG. 4, four differing impedance sections A, B, C, and D are shown, but the number of different impedances used and their arrangement are preferably flexible. Filter 360 is preferably placed proximate to the air intake end of equipment 310 as shown in FIG. 3, such that there is no place for the air to remix on the downstream side of the filter, in order to preserve the desired airflow pattern. This positioning uses equipment 310 as dividers so as not to require additional dividers that would increase the air impedance and/or size of case 300. Likewise, in embodiments where a filter 360 is positioned to modify air flow as the air exits an electronics case region, placing filter 360 proximate the electronic equipment will aid in maintaining a desired flow pattern.

By distributing air within the case using filter 360, the system airflow profile can be adjusted by using air filters with different impedance arrangements. If more equipment is added or removed from the system, a different air filter that properly distributes the air flow over the new configuration can be used to maintain optimal cooling.

In either a positive pressure arrangement, a negative pressure arrangement, or a convection arrangement, filter 360 may be mounted on the intake or exhaust side of the electronic equipment. If air movers 320 are placed too close to filter 360, however, air movers 320 may dominate the airflow pattern, thus reducing the effectiveness of filter 360 at distributing the air. Thus, in a preferred embodiment, at least one filter 360 is mounted on the opposite side of the electronics from any air movers 320. Also, in a preferred embodiment filter 360 is mounted on the intake side of the electronic equipment to reduce dust buildup on the equipment.

Referring to FIG. 4, an exploded view of a filter 360 according to one embodiment of the invention is shown. In this embodiment, filter 360 includes a frame 410 to house both a variable filter media 430 and a metal mesh 420. The frame 410 provides a rigid structure, which is particularly useful with flexible filter media. Having the filter media housed in a frame also allows for the filter to be more easily removed and replaced when a new filter, when it is desired that the filter be readily replaceable.

Although metal mesh 420 is optional, its usage can provide benefits. Metal mesh 420 acts to hold filter 430 in place, and may additionally act to increase EMI containment and extraneous noise rejection for the electronics section of the case 300. This is an improvement over current baffle design, where large holes are used. Because holes through a solid baffle present a much higher impedance to air than a mesh does, fairly large holes are required in a baffle. These large holes do not provide EMI containment with the same effectiveness as a fine mesh.

In addition, metal mesh 420 may also be used as a filtering layer. For example, if relatively high differential air flow is desired between two filter sections, a section of filter 430, such as an impedance section A, may be removed completely, leaving nothing but metal mesh 420 to filter the air in that section. Metal mesh 420 therefore will act as a filter for large objects and debris. In preferred embodiments, metal mesh 420 comprises a stainless steel mesh formed with 31 gauge wire arranged to have an open area greater then 70%.

Figure 5:
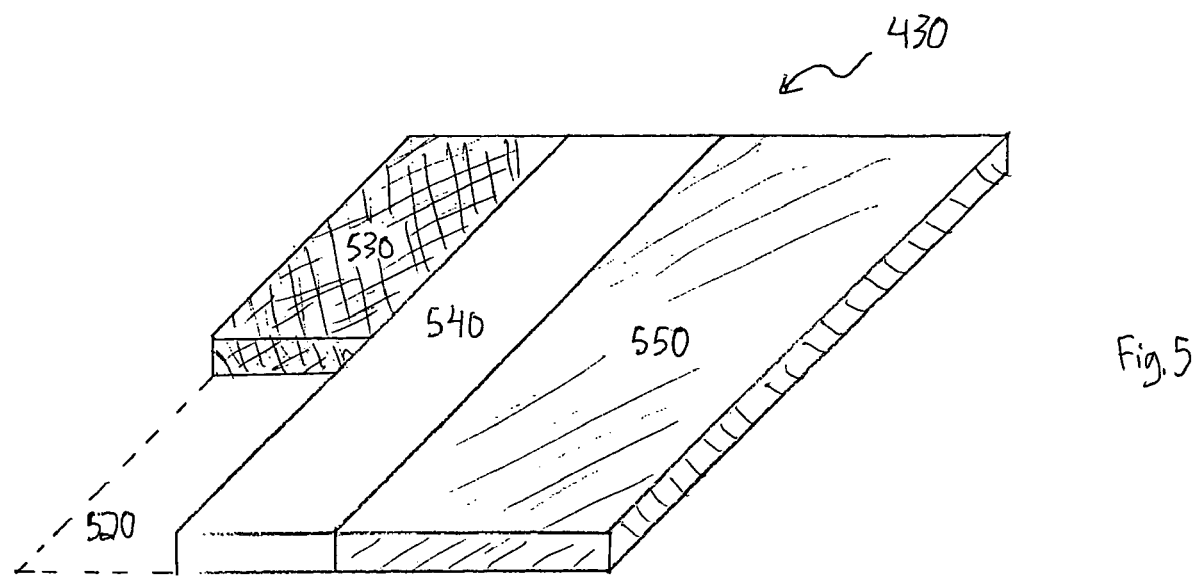
FIG. 5 shows a filter with a variable impedance using a material with a porosity that is varied.

Filter media 430 may be constructed of a variety of materials. FIG. 5 depicts an embodiment in which the filter media 430 is constructed of a porous material where the porosity (pores-per-inch or PPI) varies over the surface. Preferably, this porous material is a material that has good filtering as well as fire-retarding properties such as an open cell polyurethane foam. In preferred embodiments at least two sections of the filter media exist with different PPI values. For example, where low air flow is desired the filter media may be constructed out of ¼" polyurethane foam with 45 PPI density and where higher air flow is desired, the filter media may be constructed out of ¼" polyurethane foam with only 25 PPI density. FIG. 5 shows three sections 530, 540, and 550, each with different porosity.

Figure 6:
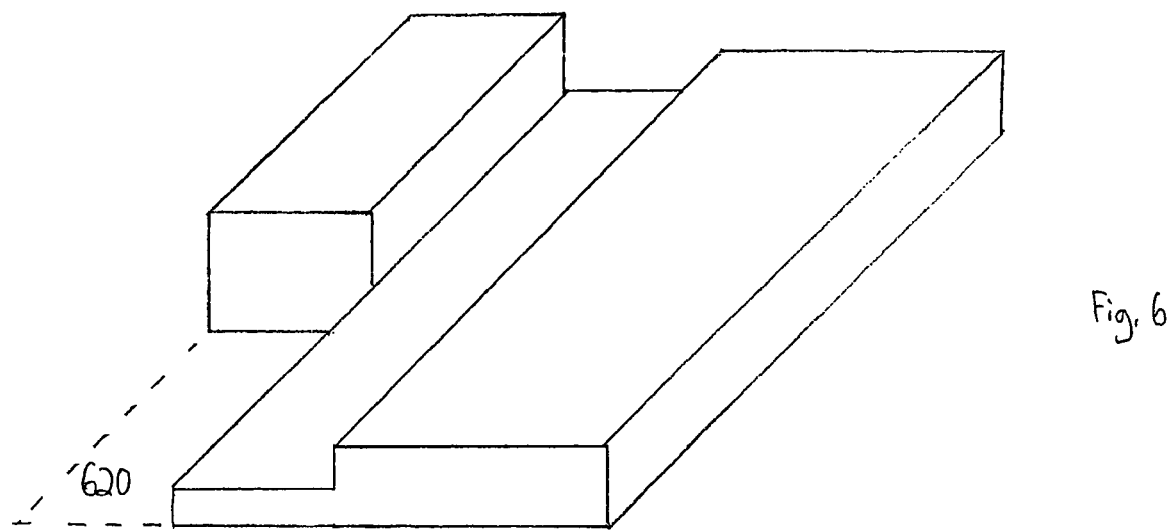
FIG. 6 shows a filter with a variable impedance using a porous material with a thickness that is varied.

FIG. 6 depicts another embodiment in which the filter media in different regions is constructed out of a similarly porous material, but where the thickness of the material is varied over the surface of the filter. Thickness alone, or a combination of thickness and PPI variations, can be used to modify case airflow.

Figure 7:
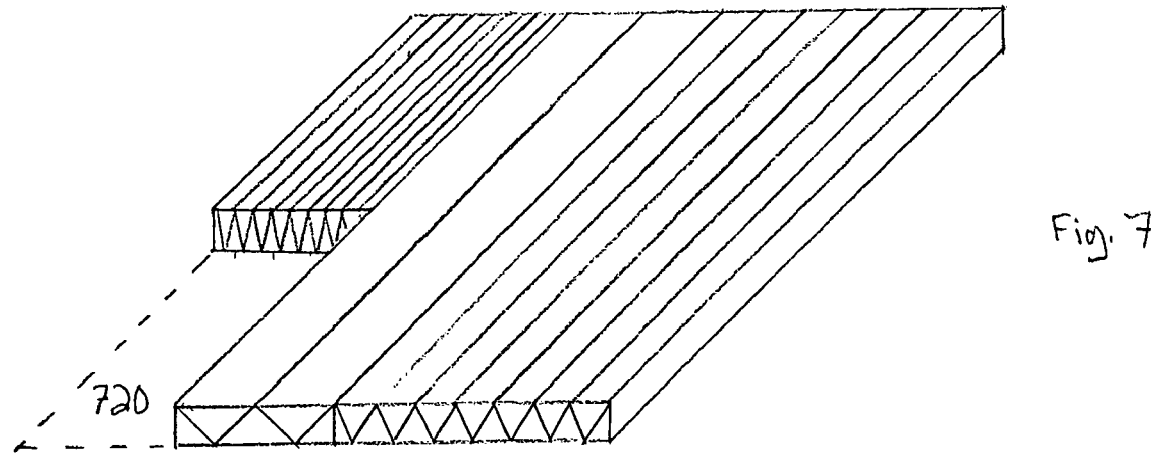
FIG. 7 shows a filter with a variable impedance using pleatings with a pleat density that is varied.

FIG. 7 depicts yet another embodiment in which the filter media is constructed out of a pleated material where the pleat density and/or thickness varies over the surface of the filter.

Figure 8:
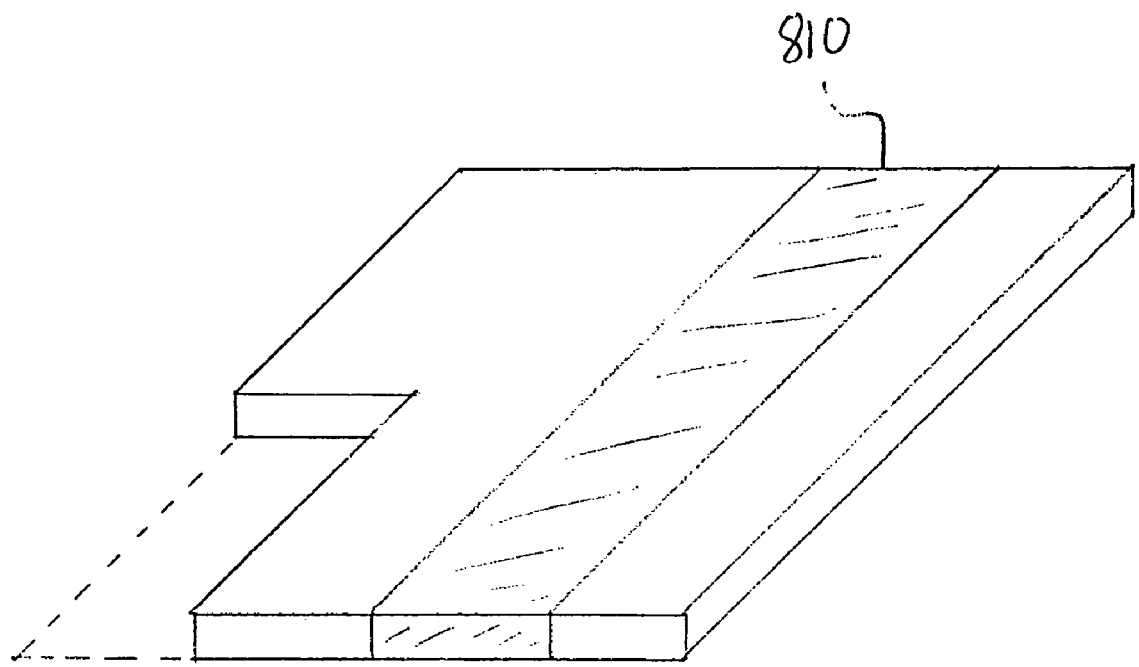
FIG. 8 shows a variable impedance filter with a solid section.

In some sections, a solid material can be substituted for the filter media, therefore not letting any air pass through in those sections. This may be advantageous if there are sections that require no cooling, such as a power supply that contains its own cooling fans, or empty bay areas reserved for future expansion. By not distributing air where it is not needed, more airflow may be available to cool sections that require cooling. For example, FIG. 8 contains a filter media layout comprising a section 810 mode of a solid material that blocks airflow where it is not needed. A solid section such as section 810 may be used in combination with any filter media.

At the opposite end of the airflow impedance spectrum, other sections of the filter media 430's impedance may be nearly zero, thereby presenting nearly no impedance to moving air. This allows sections of case 300 that operate at the highest power dissipation to receive the most cooling. This approach can also compensate for "dead spaces" that, due to case characteristics, tend to received less airflow. Sections of the filter media can be removed to insure maximum attainable air flow in those areas. For example, sections 520, 620, and 720, of FIGS. 5, 6, and 7, respectively, can be removed to increase air flow in those areas.

As illustrated, the filter media 430's impedance may vary from front-to-back, or from left to right, or even in both directions. This flexibility of impedance variation allows the air filter to adapt to various system configurations by using a filter media arrangement that has an appropriate air distribution profile. In this manner the filter may be used to adjust not only for even air distribution but also for a very specific pattern of air distribution to ensure each component receives sufficient cooling.

Referring back to FIG. 4, filter 360 may be constructed by mounting filter media 430 on frame 410. In some preferred embodiments, frame 410 is designed such that cross members (e.g., 412, 416, 419) are specifically located at places where a junction between different filter impedances might be desired. For example, a junction 433 between impedance sections A and C is placed over frame cross-member 412; a junction 435 between impedance section A and impedance section B is placed over frame cross-member 416; and a junction 437 between impedance section C and impedance section D is placed over frame cross-member 419. Also, a section of frame 410 may be left in place where no cooling capacity will ever be required, such as at thick cross-member 419 in this example.

Metal mesh 420 may be attached to frame 410, e.g., by crimping and/or adhesive bonding. In preferred embodiments, metal mesh 420 is crimped to at least one edge of the frame 410. For example, mesh 420 is crimped to edge 418 of frame 410. This crimping allows air to flow much closer to that edge of the filtering system because no extra spacing is required to preserve space for a line of adhesive. The choice of which edges are crimped and which are adhesively bonded gives an additional degree of control of the air flow pattern.

On the edges that are not crimped, and on the cross members, a first adhesive is applied. Mesh 420 is then laid over frame 410 and bonded to form a mesh/frame combination. A second adhesive can then be placed on the mesh/frame combination, and the different filter media 430 sections are bonded to the second adhesive. In preferred embodiments, the filter media 430 sections are laid over the mesh/filter combination before the first adhesive has set, thereby allowing the same adhesive that bonds mesh 420 to frame 410 to be used to bond filter media 430 to the mesh/frame combination.

The variation in filter media 430's impedance may be created by assembling a plurality of filter pieces with different impedance directly on the mesh 420. Each piece may be individually cut, then placed on the mesh where the corresponding impedance is desired. In other embodiments, the variable impedance filter may be prefabricated and laid onto the frame as a single piece.

Although an exemplary electronics case 300 has been illustrated, and other variations have been described, the present invention is not limited to specific chassis arrangements or orientations. For instance, some chassis use side-to-side airflow, and may choose to mount a variable impedance filter, according to an embodiment of the present invention, on the side of an electronics cavity. Generally, the preferred filter mounting position is perpendicular, or roughly so, with respect to the desired direction of air flow in an electronics cavity, but many different possibilities exist for the filter's location.

Some chassis configurations may also use multiple air filters according to an embodiment of the present invention. For instance, a system with multiple electronics chambers can use one or more filters for each chamber. The air filter itself can be permanently or removably affixed to a chassis, or to a subsystem thereof such as an air mover tray.

One of ordinary skill in the art will recognize that the concepts taught herein can be tailored to a particular application in many other advantageous ways. For instance, although embodiments using specific filter materials have been described, those skilled in the art will understand that the present invention encompasses any filter media or combination of different filter medias. For example, a filter can be used that combines a pleated media in some sections, and a porous material in other sections. Furthermore, the present invention encompasses a variety of ways to prevent air from flowing where it is not needed such as by inserting a solid material in place of a section of filter media, or by using a frame with a solid section or a combination of both techniques. The air filter need not be the only filter present in the case—some embodiments can even be formed using multiple adjacent filters each with their own frame, with each contributing to shaping the overall airflow. A filter according to an embodiment also could be constructed using modular filter sections that snap or slide together at their edges, allowing fabrication or easy modification in a plurality of possible configurations. A mesh may not be required in all embodiments.

Although the specification may refer to "an", "one", "another", or "some" embodiment(s) in several locations, this does not necessarily mean that each such reference is to the same embodiment(s), or that the feature only applies to a single embodiment.

What is claimed is:

1. A case for mounting electronic equipment, the case comprising:
   an outer chassis having a cavity for mounting electronic equipment;
   a chassis cooling path to move air to, through, and from the cavity; and
   an air filter provided in the chassis cooling path and proximate to the electronic equipment mounting location, wherein the air filter has a finite airflow impedance that is varied over the filtering surface to adjust the distribution of airflow within the cavity.

2. The case of claim 1, wherein the air filter comprises:
   a filter media;
   a removable frame to support the filter media; and
   a mesh to further support the filter media.

3. The case of claim 2, wherein the mesh comprises a metal mesh adapted to filter out electromagnetic interference.

4. The case of claim 3, wherein the metal mesh comprises a stainless steel mesh formed with 31 gauge wire arranged to have an open area greater then 70%.

5. The case of claim 2, wherein no filter media exists over at least one portion of the mesh.

6. The case of claim 1, wherein at least one non-frame air filter section comprises a media that blocks airflow through a segment of the filtering surface.

7. The case of claim 1, wherein the air filter comprises a porous material having a porosity that varies over the filtering surface.

8. The case of claim 7, wherein the porous material comprises an open cell polyurethane foam.

9. The case of claim 1, wherein the air filter comprises a porous material having a thickness that varies over the filtering surface.

10. The case of claim 1, wherein the air filter comprises a pleated media having a pleat density that varies over the filtering surface.

11. The case of claim 1, wherein the air filter has an impedance that varies both front to rear and laterally across the filtering surface.

12. The case of claim 1, further comprising at least one air mover to draw cooling path air into the case by creating an internal case pressure lower then the external case pressure.

13. The case of claim 12, wherein the air filter is placed in the chassis cooling path at a point downstream of the electronic equipment mounting location.

14. The case of claim 12, wherein the air filter is placed in the chassis cooling path at a point upstream of the electronic equipment mounting location.

15. The case of claim 1, further comprising at least one air mover to force cooling path air out of the case by creating an internal case pressure higher than the external case pressure.

16. The case of claim 15, wherein the air filter is placed in the chassis cooling path at a point downstream of the electronic equipment mounting location.

17. The case of claim 15, wherein the air filter is placed in the chassis cooling path at a point upstream of the electronic equipment mounting location.

18. The case of claim 1, further comprising at least one ramp adapted to direct airflow across the air filter.

19. The case of claim 18, further comprising means for adjusting the position of the at least one ramp within the case.

20. The case of claim 1, the chassis cooling path comprising a plenum proximate to the side of the air filter opposite the electronic equipment.

21. An air filter that comprises:
a filter media having at least two extended filtering surface regions with different finite air impedances;
a frame to support the filter media; and
a metal mesh disposed within a filtering surface of the frame, the metal mesh adapted to filter electromagnetic interference.

22. The air filter of claim 21, wherein the filter media comprises a porous material having a porosity that varies over the filtering surface.

23. The air filter of claim 21, wherein the filter media comprises a porous material having a thickness that varies over the filtering surface.

24. The air filter of claim 21, wherein the filter media comprises a pleated media having a pleat density that varies over the filtering surface.

25. The air filter of claim 21, wherein the filter media has an impedance that varies both front to rear and laterally across the filtering surface.

26. The air filter of claim 21, wherein at least one non-frame air filter section comprises a media that blocks airflow through a segment of the filtering surface.

27. The air filter of claim 21, wherein the frame comprises at least two separately fabricated frame sections, each holding a corresponding filter media section providing at least two of the extended filtering surface regions with different finite air impedances.

28. The air filter of claim 27, wherein the at least two frame sections each comprise frame features for interlocking the frame sections together.

29. A method of cooling electronic equipment mounted in a chassis, the method comprising:
allowing cooling air to pass through the chassis;
directing the cooling air over the electronic equipment; and
passing the cooling air through an air filter proximate to the electronic equipment, the air filter constructed to alter the distribution of the cooling air directed over the equipment.

30. The method of claim 29, where the air filter alters the distribution of the cooling air using at least one section wherein airflow impedance is provided solely by a metal mesh, and another section where the airflow impedance is provided at least in part by a filter media.

31. The method of claim 30, further comprising filtering electromagnetic interference through the metal mesh.

32. The method of claim 29, wherein the air filter alters the distribution of the cooling air using a construction that varies airflow impedance both front to rear and laterally across the surface of the filter.

33. The method of claim 29, where the air filter alters the distribution of the cooling air using a construction that decreases airflow impedance towards a lateral edge of the filter.

34. The method of claim 29, wherein electronic equipment can be mounted in the chassis in different configurations having different cooling needs, the method further comprising selecting, for different configurations, one of at least two different air filter constructions that alter the distribution of the cooling air in different ways.

35. The method of cooling of claim 29, further comprising creating an internal chassis pressure, proximate the electronic equipment, lower then the external chassis pressure.

36. The method of cooling of claim 29, wherein the cooling air is passed through the air filter prior to cooling the equipment.

37. The method of cooling of claim 36, wherein the electronic equipment and air filter are proximate in such a manner that the electronic equipment partitions cooling air flow downstream of the air filter and substantially prevents air remixing downstream of the air filter.

38. The method of cooling of claim 29, wherein the cooling air is passed through the air filter after cooling the equipment.

39. The method of cooling of claim 29, further comprising creating an internal chassis pressure, proximate the electronic equipment, higher then the external chassis pressure.

40. The method of cooling of claim 29, wherein the electronic equipment is contained in at least two chassis sections, and wherein the air filter is disposed between the two chassis sections.

41. A method of fabricating an air filter comprising:
preparing a frame having at least one framed open section;
bonding a metal mesh onto the frame such that the mesh overlies the at least one framed open section, the metal mesh adapted to filter electromagnetic interference; and
bonding a filter media onto the frame such that the filter media overlies at least a portion of the at least one framed open section, the filter media having at least two sections with different finite air impedances.

42. The method of claim 41, wherein bonding a metal mesh onto the frame comprises applying an adhesive to the frame and applying the mesh over the adhesive.

43. The method of claim 42, wherein bonding the filter media onto the frame includes positioning the filter media on top of the metal mesh before the adhesive has set.

44. The method of claim 41, wherein bonding a metal mesh onto the frame comprises crimping at least one edge of the mesh to the frame.

45. The method of claim 44, wherein crimping at least one edge of the mesh to the frame comprises crimping the mesh at an edge of the frame, leaving at least one of the open sections substantially borderless along the crimped edge of the frame.

46. The method of claim 41, wherein bonding the filter media onto the frame includes leaving a portion of the mesh overlying the at least one open framed section uncovered by the filter media.

47. The method of claim 41, wherein the frame is metal.

48. The method of claim 41, wherein bonding the filter media onto the frame includes assembling a plurality of filter media pieces having different air impedances onto the frame.

49. The method of claim 41, wherein bonding the filter media onto the frame includes bonding a single filter media piece having at least two sections with different finite air impedances onto the frame.

50. The method of claim 41, wherein the frame includes an integral non-frame section that does not allow any air to pass through.

51. The method of claim 41, further comprising assembling the frame from two frame sections, each having filter media bonded thereto.

* * * * *